(No Model.)

G. H. MERRICK.
BUSHING AND FAUCET FOR BARRELS.

No. 520,239.        Patented May 22, 1894.

Witnesses,

Inventor,
George H. Merrick
By Dewey & Co.
Attys

THE NATIONAL LITHOGRAPHING COMPANY,
WASHINGTON, D. C.

UNITED STATES PATENT OFFICE.

GEORGE H. MERRICK, OF SAN FRANCISCO, ASSIGNOR TO W. FRANK PIERCE, OF OAKLAND, CALIFORNIA.

BUSHING AND FAUCET FOR BARRELS.

SPECIFICATION forming part of Letters Patent No. 520,239, dated May 22, 1894.

Application filed July 20, 1893. Serial No. 481,049. (No model.)

*To all whom it may concern:*

Be it known that I, GEORGE H. MERRICK, a citizen of the United States, residing in the city and county of San Francisco, State of California, have invented an Improvement in Bushings and Faucets for Barrels; and I hereby declare the following to be a full, clear, and exact description of the same.

My invention relates to certain improvements in bushings and faucets for barrels.

It consists in certain details of construction which will be more fully explained by reference to the accompanying drawings, in which—

Figure 1:
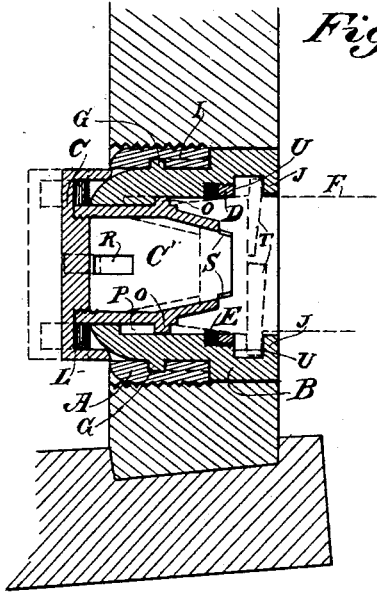
Figure 2:
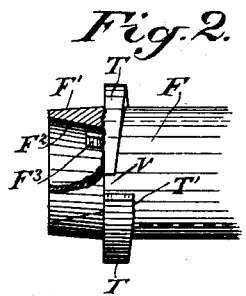
Figure 3:
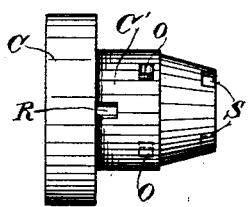
Figure 4:
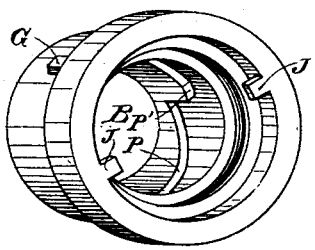
Figure 5:
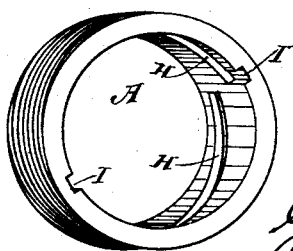

Figure 1 is a vertical section taken through the device showing also a section of part of the cask to which it is fitted. Fig. 2 is a view of the end of the faucet, part being broken away to show the interior. Fig. 3 is an exterior view of the valve. Fig. 4 is a perspective view of the bushing B. Fig. 5 is a perspective view of the ring A.

The object of my invention is to provide a simple and effective device for drawing liquids from casks, a means for opening and closing the valve and for locking the same firmly on its seat when closed.

In the construction of my device, I employ a permanent screw-threaded ring or bushing A which is fixed in an opening in the end of the cask as shown. This ring is sufficiently less in depth than the thickness of the head of the cask so as to leave a space between its outer end and the exterior of the cask. Into this space, the enlarged portion B of the bushing fits without screw-threads, while the inner portion is provided with exterior screw-threads, or preferably with projecting lugs G which enter corresponding spirals H in the interior of the fixed ring A by first passing down through the vertical slots I from the exterior end of the ring A, and at the bottom of these slots the lugs enter the spirals H and are turned until the interior bushing is firmly locked within the ring. This bushing has upon its outer end the inwardly projecting lugs J. Interior to these is a screw-threaded portion having a shoulder at the bottom upon which rests an elastic washer E, the inner periphery of which projects inwardly a little. This washer is held in place by means of a ring D which screws into the threaded portion of the depression, and thus holds the washer down to place, leaving the inner periphery projecting within the ring and the seat.

The valve C is in the form of a cup containing an elastic annular washer L. The outer portion of the valve forms a projecting flange or rim extending toward the inner end of the bushing B, and the central portion projects inwardly a little way and has screw-threads upon it upon which is screwed the inwardly extending sleeve C'. The washer L occupies a position between the exterior of this sleeve and the interior of the rim which surrounds the valve, and when the valve is fully seated, this washer is pressed against the rounded inner end of the bushing B against which it forms a close joint. The inwardly projecting sleeve C' has upon the outside the lugs O, and the interior of the bushing B has the two inclined ledges P formed within it, upon which the lugs O are adapted to travel. When the sleeve C' and the valve are turned in one direction, the lugs O move down the incline, and allow the valve C to move away from its seat until the openings R which are made through it are exposed within the head of the cask, so that liquid may flow through them and into the interior of the sleeve C'. When the sleeve C' is turned in the opposite direction the lugs O move up the inclined ledges, thus drawing the valve to its seat where the elastic washer L fits tight against the inner end of the bushing B. The terminal ends of the ledges at this point are made flat or in a plane extending approximately in a circle around the interior of the bushing, so that when the lugs O have reached this point, and the valve is fully closed, the lugs pass upon these flattened portions where they are securely locked, and the valve is prevented from being opened by any jar or accident, such as would be liable to occur if only the angle of the screw-threads were depended upon to hold the valve in its closed position. The inner end of the sleeve C' is made in the form of a frustum of a cone and has slots S made in it.

F is the barrel of the faucet. The exterior of its inner end is also made slightly tapering, as shown at F', and the interior is made conical, as shown at F², Fig. 2, so as to fit over the conical end of the sleeve C'.

Within the conical portion of the barrel F are the projecting lugs F³, and these lugs enter the slots S of the sleeve C' when the faucet portion is introduced into the bushing. At the same time the exterior conical portion F' fits against the inner periphery of the elastic ring E and thus makes a tight joint at this point.

Upon the exterior of the faucet barrel F are made the projecting flanges T. The faces of these flanges adjacent to the inner end of the faucet are flat and form a circular plane around the faucet barrel. These faces are forced down against the annular flat shoulder U which is formed exterior to the washer E and ring D as shown in Fig. 1, as follows: The inclined or spiral surfaces of the flanges are sufficiently separated upon the opposite ends, as shown, to leave an open space, as shown at V, Fig. 2, and this open space upon each side is of sufficient width to pass between the lugs J of the outer end of the bushing. When the faucet is to be introduced into the bushing, the open spaces or slots V are brought opposite the inwardly projecting lugs J which allows the inner end F' of the faucet to be introduced to its position as before described. In this position, the outer conical surface F' fits snugly within the inner periphery of the elastic ring E, and the lugs F³ enter the slots S on the conical end of the seat C'. The faucet is then turned, and the inclined surfaces of the flanges T pass beneath the lugs J of the bushing so as to force the inner flat surfaces of the flanges down against the seat U. At the same time, the sleeve C' is turned simultaneously with the faucet barrel by the action of the lugs F³ upon the slots S of the sleeve, and as the pitch of the ledges P is the same as that of the outer inclined surfaces of the flanges T, it will be manifest that the valve C will be moved inwardly at the same rate, and with the same movement as that of the faucet until the flanges T have become seated upon the shoulders U, when the valve is sufficiently opened to allow the liquid to pass through the faucet.

In order to insure the faucet remaining in its position and to lock it in place, I have formed the ends of the inclined surfaces of the flanges T with a flattened portion T' which is in a plane transverse to the axis of the faucet and parallel with the inner faces of the flanges. This flattened portion T' corresponds with the flattened portion P' of the spiral ledges P, so that when the valve is fully closed, the lugs O upon the sleeve C' will rest upon the surfaces P' at the top of the spirals P, and the faucet barrel being seated in its place the flattened surfaces T' of the spiral flanges will stand beneath the lugs J of the bushing, and this firmly locks the parts in place. As the inclined flanges T turn inside the lugs J of the bushing, the valve will be forced back and opened as it turns, while by reason of the lugs O traveling upon the spiral ledges P when turned in an opposite direction, they will in turn close the valve, and move the faucet outward.

Any suitable form of cock, not here shown, is employed upon the outer end of the faucet barrel to draw the liquid as may be desired.

The outer end of the bushing B may be closed when the faucet is removed, by means of a cap having spiral flanges similar to those shown at T, and adapted to lock beneath the lugs J, thus closing the interior of the bushing, while the cask is being transported or otherwise out of immediate use.

Having thus described my invention, what I claim as new, and desire to secure by Letters Patent, is—

1. The combination, of a retaining ring having external threads by which it is secured within the barrel opening at a point inside of its outer surface and provided with internal spirally arranged channels with other channels opening outwardly therefrom, a bushing adapted to be fitted in said ring having an enlarged head at its outer end forming a shoulder adapted to abut against the end of said ring and having lugs upon its exterior for engaging the channels of the ring, said enlarged head having the oppositely located lugs at its outer end; a valve having a hollow sleeve adapted to project into the bushing and provided with lugs for engaging the inner spirals of the bushing, and a faucet having a barrel adapted to slip over the inner end of the sleeve and provided with lugs engaging openings in the latter and inclined lugs adapted to engage the lugs of the bushing, substantially as herein described.

2. The combination, with the retaining ring having the internal spiral channels with outlets, of a bushing having lugs engaging said channels, and having other lugs at its entrance end, and an interior threaded portion and engaging ring for securing a packing in place, a valve having a stem projecting into the bushing with a passage through it for the liquid and provided with lugs engaging inclines on the interior of the bushing whereby it may be advanced and retracted, and a faucet having a barrel to be fitted over said sleeve and to engage and turn it, said faucet barrel having inclined lugs engaging the lugs at the entrance of the bushing and adapted to engage with the packing ring to form a tight joint.

3. The combination, of a retaining ring fixed within the barrel opening and having internal spiral channels with outlets therefrom, a bushing having internal spiral guides or channels and lugs on its outer circumference and entrance end, a hollow sleeve within and fitting the inner end of the bushing and having lugs engaging its inner spiral guides or channels, a valve carried by the sleeve, and a faucet having spirally disposed lugs engaging the lugs at the entrance of the bushing and other lugs engaging the sleeve whereby the faucet is locked to the bushing and advanced as the valve opens and retracts simultaneously with the closing of the valve.

4. The combination, of a retaining ring, a bushing and a hollow sleeve each concentric with the other, said sleeve having a conical inner end provided with recesses, carrying a valve, and having lugs engaging inclined surfaces on the bushing; and a faucet having the inner end of its barrel adapted to receive the conical end of the sleeve and provided with lugs engaging the recesses of the sleeve and having other lugs engaging the bushing.

5. The combination, of a bushing, a valve having an inwardly projecting sleeve the end of which is made conical and provided with lugs engaging spiral channels on the bushing, a faucet having its interior made conical to receive the like end of the sleeve, and lugs on one of the cones engaging recesses in the other to cause the faucet and sleeve to engage, said faucet having means for locking it to the bushing.

6. The bushing removably fixed in the barrel opening and permanent retaining ring, a valve having an annular channel around its periphery, and an elastic washer adapted to be seated against the inner end of the bushing to form a tight joint, an inwardly projecting sleeve with exterior lugs, spiral ledges within the bushing upon which said lugs travel to open or close the valve, openings through the side of the sleeve which are exposed to allow the contents of the cask to enter the interior of the sleeve when the valve is opened, a frustum of a cone formed upon the inner end of the sleeve having slots made in the end, a faucet barrel having the interior made conical to fit the exterior of the frustum upon the sleeve, and interior lugs which engage the slots in the sleeve, flanges formed upon the faucet barrel with spirally inclined exterior faces, inwardly projecting lugs within the outer end of the bushing beneath which the spirally disposed flanges of the faucet barrel pass when the latter is turned to open the valve, whereby a corresponding and simultaneous movement of the valve and the faucet takes place when the faucet is turned in either direction, substantially as herein described.

7. The bushing removably fixed within the barrel opening, and having spirally disposed ledges upon the interior a valve adapted to close against the inner end of the bushing having a sleeve extending into the interior of the bushing with exterior lugs which travel upon the spiral ledges to open or close the valve, a faucet having lugs upon the inner end of its barrel, a coned inner end to the sleeve with slots made at the end to receive the said lugs on the correspondingly coned inner end of the faucet barrel which fits over the inner end of the sleeve, spiral flanges surrounding the faucet barrel, inwardly projecting lugs in the outer end of the bushing beneath which the spiral flanges of the faucet barrel pass when the latter is rotated, flattened portions T' of said flanges which pass beneath the lugs when the valve is fully opened and lock the faucet in position, substantially as herein described.

8. The bushing removably fixed in the barrel opening, the valve adapted to seat against the inner end of the bushing a sleeve extending from the valve into the interior of the bushing having lugs upon its outer surface, spiral ledges upon the interior surface of the bushing upon which said lugs travel to open or close the valve, a conical inner end to the sleeve having slots a faucet having a barrel correspondingly cone-shaped to fit over the end of the sleeve, and having lugs adapted to engage said slots spirally disposed flanges around the faucet barrel adapted to engage inwardly projecting lugs upon the outer end of the bushing whereby the valve is opened and the faucet locked in position, and a flexible annular washer E secured within the bushing adapted to fit and form a joint around the exterior conical surface of the faucet, substantially as herein described.

In witness whereof I have hereunto set my hand.

GEORGE H. MERRICK.

Witnesses:
S. H. NOURSE,
J. A. BAYLESS.